UNITED STATES PATENT OFFICE.

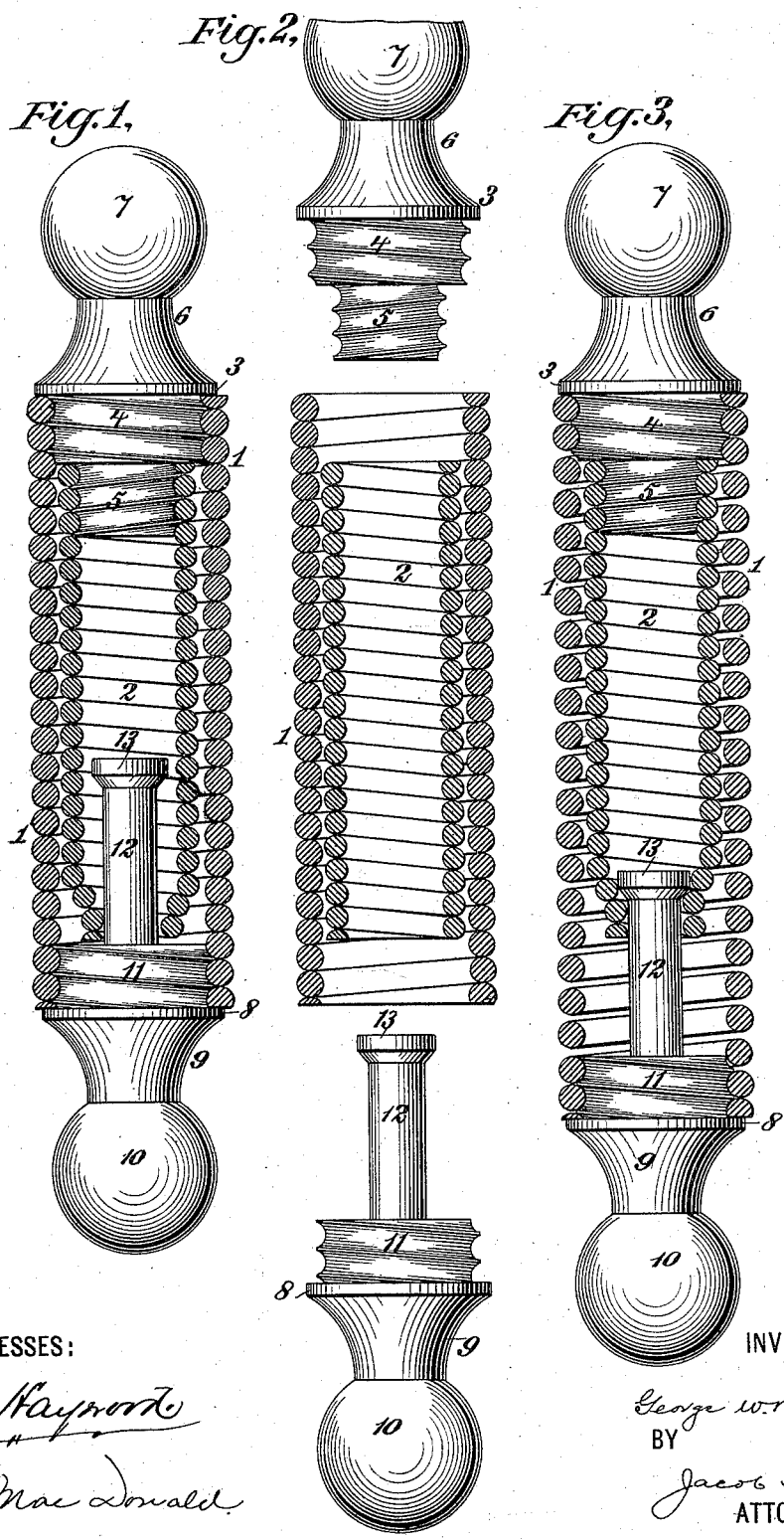

GEORGE W. N. YOST, OF NEW YORK, N. Y.; C. GODFREY PATTERSON, CHARLES W. YOST, AND SOPHIA C. YOST, EXECUTORS OF SAID GEORGE W. N. YOST, DECEASED; SAID PATTERSON AND CHARLES W. YOST ASSIGNORS TO E. & H. DENSMORE, OF SAME PLACE.

SPRING.

SPECIFICATION forming part of Letters Patent No. 575,451, dated January 19, 1897.

Application filed June 28, 1894. Serial No. 515,927. (No model.)

*To all whom it may concern:*

Be it known that I, GEORGE W. N. YOST, a citizen of the United States, and a resident of New York city, in the county of New York and State of New York, have invented certain new and useful Improvements in Springs, of which the following is a specification.

My invention relates particularly to coiled springs, and has for its main objects, first, to provide simple and effective means for securely connecting various devices to the ends of such springs, and, secondly, to provide an efficient differential or compensating coiled spring.

To these main ends my invention consists, first, in combining a threaded device with a coiled spring by a screwing action of the parts, and, secondly, in a compound spring composed of an inner spring and an outer spring, the outer spring being provided at one end with a device adapted to distend the inner spring when the outer spring has been distended or stretched to a predetermined extent; and my invention consists, moreover, in certain details of construction and arrangement of parts, all as will be hereinafter more fully described, and particularly pointed out in the appended claims.

In the accompanying drawings, Figure 1 is a side view of a compound compensating spring embodying my improvements, the springs being shown in central vertical section. Fig. 2 is a three-part view showing the springs and their connecting devices detached; and Fig. 3 is a view similar to Fig. 1, but showing the outer spring distended and the distention of the inner spring as having just commenced.

In the several views the same parts will be found designated by the same numerals of reference.

1 is the outer coiled spring, which is made cylindrical in form, and 2 the inner coiled spring, which is likewise made cylindrical in form. The coils of the outer spring are shown wound left-handed, while the coils of the inner spring are shown wound right-handed. The size of the inner spring is preferably enough smaller than the bore of the outer spring to prevent contact of said springs, and hence the emission of any noise due to a rubbing action between said springs, and also to obviate any liability of the convolutions of the inner spring catching upon or in between the convolutions of the outer spring; but by the construction shown if through flexure or distortion the inner spring should contact with the outer spring it is impossible even then for the coils to catch or interlock by reason of the fact that the coils are formed in opposite directions, or are arranged at an angle to one another. The springs are shown as made of round wire, but this is not essential.

At the upper end of the contrivance is a connecting device consisting of a head or flange 3, a screw 4, contiguous thereto, and a screw 5, projecting axially from said screw 4. The screw 4 is cut or formed left-handed to correspond with the rounds of the outside spring 1 and is of a size or diameter to snugly and tightly fit the bore or interior of the upper end of said spring, the channels between the threads of the screw being preferably round to receive the corresponding inner surfaces of the coils, as illustrated.

The screw 5 (preferably made integral with the screw 4) is smaller in diameter than the latter and of a size to closely fit the bore of the inner spring at its upper end. This screw 5 is cut or formed right-handed in accordance with the direction of winding of the inner spring, and the channels between its threads are also made round to match the inner surfaces of the coils of its associated spring.

Extending up from the head or flange 3 is a neck 6, which terminates in a ball or spherical end 7, adapted to a corresponding socket-piece. (Not shown, but hereinafter again referred to.)

At the lower end of the spring contrivance is another connector having a head or flange 8, neck 9, ball 10, screw 11, cylindrical stem 12, and a shoulder or abutment 13 at the inner free end of the latter. The screw 11 is made similar to the screw 4 and engages with the lowermost coils of the outer spring 1 in the manner illustrated and above described with reference to the screw 4. The stem 12 is elongated and extends axially from the screw 11 into the bore or interior of the inner spring 2, as shown at Fig. 1. The lowermost coils of the inner spring are, after the introduction of the stem, tapered or contracted about the stem to enable the circular shoulder or abutment 13 to act upon and stretch or distend said spring, as will be presently described.

The several parts of the spring contrivance may be assembled or combined in either of two ways, viz: The upper end of the smaller inner spring may be first screwed onto the smaller screw 5. The upper end of the larger spring may next be screwed onto the larger screw 4. The lower end of the smaller spring may now be distended or elongated by the engagement therewith of a suitable tool beyond the open lower end of the larger spring. The stem 12 may then be inserted into the bore of the smaller spring, which by suitable tools may then be reduced in diameter around the stem and below the shoulder thereon. The smaller spring may then be released from its distention and the lower end of the larger spring screwed onto the screw 11, thus completing the operation and bringing the parts together in the manner shown at Fig. 1. The assembling may, however, be effected in this wise: First, connect the stem to the lower end of the smaller spring by contracting its coils thereabout. Then screw the lower end of the larger spring upon the screw 11. Then engage the smaller screw 5 with the upper end of the inner spring, (the inner spring having been raised or projected as far as the shoulder 13 would admit.) Then permit the smaller spring to slide down the stem and the upper projected end thereof to retreat within the larger spring, and then engage the larger screw 4 with the uppermost turns of the larger spring, thus effecting a union of the parts in the manner shown at Fig. 1.

Those portions of the springs 4 which are engaged by the screws act similarly to nuts. Owing to the fact that such portions are made of spring-wire, which is slightly expanded during the insertion of the tightly-fitting screws, it is quite impossible after the parts have been screwed together to unscrew them because of the friction or grip of the coils upon the screws, the unscrewing movement having a tendency to wind the end coils of the spring helically or toward the axis of the spring and make the diameter at the end smaller, but as of course this cannot actually be done the effect is to cause the coils to hug the screw with greater force as the effort to unscrew is increased. Hence it will be seen that when the contrivance is once put together it is impossible for the parts to work loose or become accidentally detached.

In practice I have been able to separate the screw and the spring only by holding the screw in a vise or chuck and by means of a hammer and punch or analogous implement striking the free end or point of the spring repeated blows or taps and in a direction to turn the spring as a whole and at the same time unwind or enlarge the diameter of the coils.

Thus far I have used springs such as shown in connection with carriages, the body of the carriage being suspended by four of such springs, one at each corner of the body, the balls 10 being clamped in socket-pieces, so as to give the body a universal swinging movement, as well as a movement up and down.

The compound spring is employed to compensate for varying loads or weights, the outer spring acting first under a given load or weight, and then on an increase thereof the inner spring, the latter serving to relieve the outer spring from undue distention and to augment the counterbalancing power. For example, when a person of ordinary weight occupies the buggy the outer spring 1 only will be influenced, said spring being in practice made strong enough to readily counterbalance such weight; but when a person of extra heavy weight or when two or more persons occupy the vehicle the outer spring will be first acted upon and distended until the shoulder 13 on the stem, movable with the outer spring, takes a hold upon the inner spring, and then in the further movement of the outer spring under the increased load the inner spring will be distended or acted upon to further resist and sustain the load, substantially as illustrated at Fig. 3. Thus not only is additional spring-power furnished automatically in accordance with the requirements of the situation, but at the same time the outer spring is prevented from being stretched to such an extent as to lose its shape and be destroyed.

It will be understood, of course, that in some cases only a single spring will be needed, and I therefore do not wish to be limited entirely to a compound spring.

It will be further understood that inasmuch as both the single and compound springs may be used in many relations other than in carriages I do not wish to be confined to the use of such springs thereupon.

Of course it will be seen that the screws may be provided with various devices or means other than the balls shown, dependent upon the uses to which the springs are put. For instance, the screws may be provided with hooks or eyes or other fastening, connecting, or bearing devices.

At the upper end of the contrivance the two concentric springs are held in a fixed relation to each other, while at the lower end they are held in a movable relation and are successively movable thereat on account of the presence of the elongated pulling-stem, which moves with the outer spring and has a lost motion within the inner spring.

My invention is applicable to compound springs wherein compactness and strength are required without the compensating feature, and to provide such a spring it will be seen that it is only necessary to dispense with the elongated stem 12, (retaining the shoulder,) in which case both springs will be acted upon together and distended simultaneously.

Various other changes in detail construction and arrangement may be made without departing from the gist of my improvements.

What I claim as new, and desire to secure by Letters Patent, is—

1. A compound distention-spring comprising two separate coiled springs arranged one within the other, one of said springs being provided with a device for acting upon the other, and the arrangement being such that upon the distention of one of said springs to a given or predetermined extent the other of said springs is then acted upon and distended to increase the resistance.

2. The combination of two coiled springs, one surrounding the other, the said springs being held in a fixed relation to each other at one end and in a movable relation to each other at the opposite end, and a connector rigidly attached to the free end of one of said springs and provided with a device for acting upon the other spring when the first spring shall have been distended to a given or predetermined extent; substantially as set forth.

3. The combination of two coiled springs, one surrounding the other, a device attached to each end of the outer spring, a device attached to one end of the inner spring, and a movable pulling device within the other end of the inner spring, connected to the outer spring and having lost motion, whereby the inner spring may be distended after the distention of the outer spring and by the force applied thereto, substantially as set forth.

4. The combination of the two coiled springs, the screw 4, the screw 5, the screw 11, and the shoulder or abutment, substantially as set forth.

5. The combination of the two coiled springs, the screws 4, 5 and 11, the elongated stem, the shoulder or abutment, the heads or flanges, and the balls or other connecting devices, substantially as set forth.

6. The combination of the two separate, independent, coiled springs wound in opposite directions and arranged one within the other, a device attached to each end of the outer spring, a device attached to one end of the inner spring, and a movable pulling device within the other end of the inner spring and connected to the outer spring; substantially as set forth.

Signed at New York city, in the county of New York and State of New York, this 23d day of June, A. D. 1894.

G. W. N. YOST.

Witnesses:
I. C. MACDONALD,
JACOB FELBEL.